UNITED STATES PATENT OFFICE.

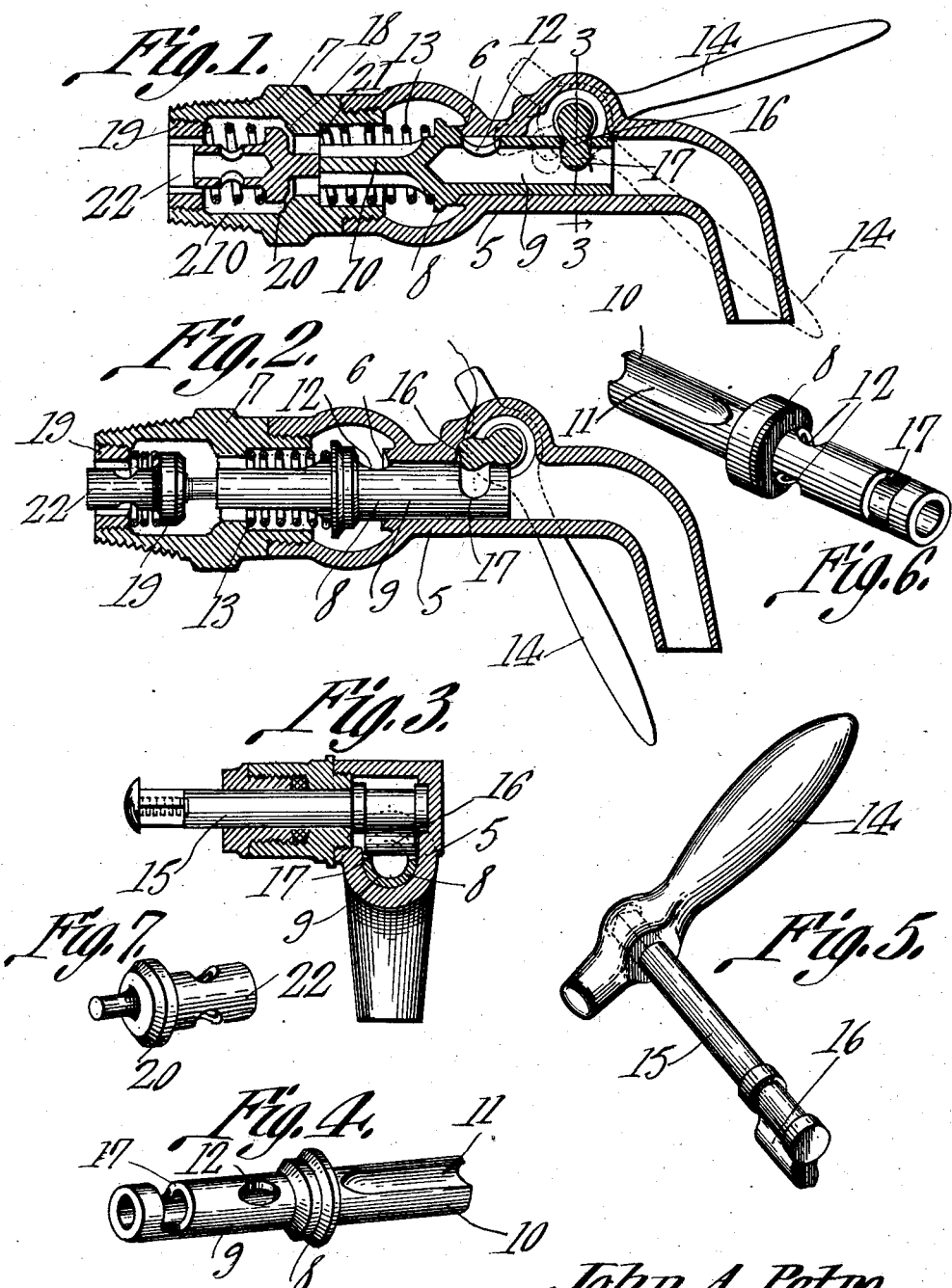

JOHN A. PETRO, OF LORAIN, OHIO.

FAUCET.

1,062,112. Specification of Letters Patent. Patented May 20, 1913.

Application filed April 12, 1911. Serial No. 620,656.

*To all whom it may concern:*

Be it known that I, JOHN A. PETRO, a citizen of the United States, residing at Lorain, in the county of Lorain and State of Ohio, have invented a new and useful Faucet, of which the following is a specification.

It is the object of the present invention to provide an improved faucet of the self-closing type. Ordinarily, such faucets require that the handle be held, in the position to which it is moved to open the valve of the faucet, until the proper amount of liquid has passed through the faucet. Thus, any one using such a faucet for example, in drawing a bucket of water, is required to hold the handle in the position stated until the bucket has been filled.

It is therefore the aim of the present invention to provide a faucet which will ordinarily automatically close but in which the handle is so constructed and arranged that, if desired, it may be held, otherwise than manually, against automatic movement to close the valve. Incidentally, the invention aims to secure this result without in any way complicating the connection between the handle and the valve stem and in fact to secure this result without the employment of any elements other than those employed in similarly constructed faucets.

A further aim of the invention is to provide a faucet which may be taken down without the necessity of shutting off the water supply and this is accomplished by the provision of an auxiliary valve which is designed to automatically close when the faucet is unscrewed from its attaching nipple.

In the accompanying drawings—Figure 1 is a vertical longitudinal sectional view through the faucet constructed in accordance with the present invention, the handle being shown in normal position in full lines and being shown in dotted lines in position to open the valve and to be returned automatically to normal position. Fig. 2 is a similar view showing the handle of the faucet moved to position to open the valve and in which position it will be held against automatic return. Fig. 3 is a vertical transverse sectional view on the line 3—3 of Fig. 1. Fig. 4 is a detailed perspective view of the primary valve and its stem. Fig. 5 is a similar view of the operating handle and related parts. Fig. 6 is a detail perspective view of a slightly modified form of primary valve. Fig. 7 is a perspective view in detail of the auxiliary valve of the faucet.

In the drawings, the faucet is illustrated as including a body 5 which is of the usual form and in fact may be modified in various ways to adapt it for use in drawing water, beer, or other liquid. The body is formed interiorly with a valve seat 6 and a nipple 7 is threaded into the body at its rear and in turn is adapted to be threaded into the end of the supply pipe from which the liquid is to be drawn. The valve is indicated by the numeral 8 and is constructed to rest against the seat 6, it having a stem a portion of which indicated by the numeral 9 projects forwardly from the valve, and a portion indicated by the numeral 10, which projects rearwardly therefrom. The portion 10 is formed with grooves 11 extending throughout nearly the entire length thereof and the portion 9 is tubular as clearly illustrated in Figs. 1, 3 and 4 of the drawings and is formed with an opening 12 through which the liquid may flow after it has entered the body by way of the grooves 11 and has passed around the valve 8, the said valve, at such times, being of course moved from its seat. The liquid passing through the portion 9 of the valve stem will of course be discharged from the faucet in the usual manner. A spring 13 is fitted upon the portion 10 of the valve stem and bears at its forward end against the valve 8 and at its rear end against the nipple 7. It will be observed by referring to Fig. 1 of the drawings, that the valve stem is fitted slidably in the body 5 and nipple 7 of the faucet and that the spring 13 serves to hold the valve firmly to its seat. It will further be observed from an inspection of Fig. 1, that the grooves 11 at their rear ends, open beyond the front end of the nipple 7 so that the water or other liquid to be drawn through the faucet, will at all times fill the grooves and that portion of the body rearwardly of the valve seat. By so constructing the portion 10 of the valve stem, the formation of a water hammer is prevented and the valve will close without undue noise.

As a means for shifting the valve away from its seat, there is provided a handle 14 having a laterally extending shank 15 which is mounted to oscillate in the body 5, transversely thereof, and in advance of the valve seat 6. At its inner end, the shank 15 is formed with a finger 16 which is of a width substantially equal to the diameter of the forward portion 9 of the valve stem. This finger 16 seats in a recess 17 formed in the upper side of the said portion 9 of the valve stem and it will be readily understood that by rocking the handle 14, the finger will work between the opposite walls of the recess and shift the valve stem. In other words, when the handle 14 is swung downwardly, the finger 16 will be rocked rearwardly and will force the valve and its stem in a corresponding direction, against the tension of the spring 13. This will move the valve from its seat and liquid may then flow through the faucet. If the handle is depressed only to about the position shown in dotted lines shown in Fig. 1 of the drawings, the spring 13 will act to automatically return it to full line position as soon as it is released. In other words, when the handle is depressed only to the degree shown in dotted lines in the said Fig. 1, the valve will automatically close when the handle is released. However, as heretofore stated, it is desirable that some means be provided for holding the valve against closing when it is desired to draw a considerable quantity of liquid through the faucet and in the instance of the present invention, this may be accomplished by merely depressing the handle 14 to a greater degree than in the first described instance. When so depressed, the handle will occupy about the position shown in full lines in Fig. 2 of the drawings. When the handle is so positioned, the finger 16 will lie in a plane occupied also by the upper edge of the rear wall of the recess 17 and the axis of the shank 15 of the handle. In other words, the end of the finger will bind against the said upper edge of the rear wall of the recess and the spring 13 will then be ineffective to close the valve and return the handle to normal position. When the desired quantity of liquid has been drawn through the faucet, however, the valve may be readily closed by pulling forwardly upon the lower end of the handle so as to move the end of the finger out of binding engagement with the said wall of the recess.

From the foregoing it will be readily understood that where the water pressure is high, the spring 13 may be omitted and the valve will be automatically closed by such pressure. It will be further observed, by referring to Figs. 1 and 2 of the drawings, that a recess is formed in the body of the faucet immediately rearwardly of the inner end of the shank 15 of the handle 14 and that when the handle is in the full line position shown in Fig. 2 of the drawing, the end of the finger will seat in this recess and further downward swinging movement of the handle will be prevented. Thus, the finger cannot be moved completely out of engagement with the valve stem and disarrangement of the parts is effectually prevented.

In the form of valve shown in Fig. 6 of the drawing, two openings 12 are formed in the stem, one located at each side thereof and perform the same function as does the single opening indicated by a corresponding reference numeral in the other figures of the drawing.

Within the nipple 7 there is formed a valve seat 18 and threaded within the nipple at its rear end is a collar 19. The auxiliary valve is indicated by the numeral 20 and has a short stem 21 projecting forwardly therefrom and resting normally against the rear end of the stem 10 of the primary valve. A spring 210 is fitted upon a rearwardly projecting stem 22 of the auxiliary valve and rests at its rear end against the collar 19 and at its forward end against the rear side of the valve 20. The stem 21 is of such length that normally the valve 20 will be held away from its seat 18 so that water or other liquid to be drawn through the faucet may fill the interior thereof back of the valve 8 at all times. When the valve 8 is moved to open position, the valve 20 will also be opened to a further degree, as, for example, as shown in Fig. 2 of the drawings. By referring to Fig. 1 of the drawings it will be readily understood that should it be desired to dismount the faucet for the purpose of repairing the same or for cleaning it, the body of the faucet may be unscrewed from the forward end of the nipple 7. As this is being accomplished, the valve 20 will be forced forwardly by the spring 210 so that when the valve body 5 has been completely dismounted, the valve 20 will close the nipple 7 and cut off the discharge of liquid therethrough. The faucet may then be repaired or cleaned and eventually replaced in position upon the nipple. This obviates the necessity of cutting off the water or other liquid supply.

What is claimed is:—

1. In a faucet, a body formed interiorly with a valve seat, a valve including a stem fitted slidably in the body and formed with a recess, and means for sliding the stem to move the valve from its seat, said means comprising an oscillatory shank, and a finger upon the shank working between the walls of the recess in the stem and adapted to bind against one of said walls when the shank is oscillated a predetermined degree.

2. In a faucet, a body formed interiorly with a valve seat, a valve including a stem fitted slidably in the body and formed with a recess, and means for sliding the stem to move the valve from its seat, said means comprising an oscillatory shank, and a finger upon the shank working between the walls of the recess in the stem, the shank being movable to bring the finger at its extremity into binding engagement with the upper edge of one wall of the recess with the finger extending bodily in a line between the said edge and the axis of the shank.

3. In a faucet, a body formed interiorly with a valve seat, a valve including a stem fitted slidably in the body, and means for sliding the stem to move the valve from its seat, said means comprising an oscillatory shank, and means projecting from the shank and engaging directly with the valve stem, the said means upon the shank being arranged to bind the stem when the shank is oscillated a predetermined distance.

In testimony that I claim the foregoing as my own, I have hereto affixed my signature in the presence of two witnesses.

JOHN A. PETRO.

Witnesses:
SAM GYONPS,
JOHN KISS.

Copies of this patent may be obtained for five cents each, by addressing the "Commissioner of Patents, Washington, D. C."